United States Patent
Zuo et al.

(10) Patent No.: US 9,562,142 B2
(45) Date of Patent: Feb. 7, 2017

(54) PROCESS FOR CRYSTALLINE LATEX PRODUCTION

(71) Applicant: Xerox Corporation, Norwalk, CT (US)

(72) Inventors: Yanjia Zuo, Rochester, NY (US); Shigeng Li, Penfield, NY (US); Peter V Nguyen, Webster, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 21 days.

(21) Appl. No.: 14/708,172

(22) Filed: May 8, 2015

(65) Prior Publication Data

US 2016/0326338 A1    Nov. 10, 2016

(51) Int. Cl.
C08J 3/07 (2006.01)
C08K 3/28 (2006.01)

(52) U.S. Cl.
CPC ... *C08K 3/28* (2013.01); *C08J 3/07* (2013.01)

(58) Field of Classification Search
CPC .......................................................... C08J 3/07
USPC .................. 523/336, 337, 339; 524/364, 391
See application file for complete search history.

(56) References Cited

U.S. PATENT DOCUMENTS 8,192,913 B2 *  6/2012  Faucher .................... C08J 3/07
                                                    430/137.11

* cited by examiner

*Primary Examiner* — Edward Cain

(57) ABSTRACT

A process for making a crystalline latex suitable for use in a toner by phase inversion emulsification (PIE) where when resin of particular acid number is neutralized to a certain degree, smaller sized resin particles are obtained reproducibly.

20 Claims, No Drawings

PROCESS FOR CRYSTALLINE LATEX PRODUCTION

FIELD

The present disclosure relates to producing crystalline latex using phase inversion emulsification (PIE) processes.

BACKGROUND

Latex emulsions of resins may be produced using PIE processes in which resins are dissolved in a mixture of water, optionally a base, and one or more organic solvents (e.g., methyl ethyl ketone (MEK), isopropyl alcohol (IPA) or both) to form a water-in-oil (W/O) dispersion (i.e., water droplets dispersed in continuous oil phase). Subsequently, water is added to convert the dispersion into an oil-in-water (O/W) dispersion. In embodiments, liquids from a prior PIE can be reused in a subsequent PIE.

Amorphous polyester latexes may be produced in a solvent reuse process with organic distillate from a previous PIE. The solvent(s), such as, MEK and IPA, from a latex emulsion can be distilled under vacuum and then used to dissolve resin in a subsequent PIE. Solvent reuse processes provide savings in raw material, solvents(s), cost and solvent disposal fees, leading to significant reduction of latex production cost. When IPA is used as a solvent, particle size of amorphous resins can correlate to amount of IPA.

When ammonium hydroxide or ammonia is used as base, the amount of ammonium hydroxide or ammonia can impact neutralization ratio of crystalline polyester resins and resin particle size. However, the acid number of crystalline resins vary. Thus, for crystalline polyester resin PIE, where an objective is to employ solvent reuse and to avoid solvent disposal fees, base amounts must be considered and carefully controlled to control latex particle size from lot to lot.

SUMMARY

The instant disclosure describes processes to obtain crystalline latex using phase inversion emulsification (PIE) where liquids from a PIE are removed and reused in a subsequent PIE comprising:

(a) dissolving a crystalline resin comprising an acid number in a mixture of at least two solvents, a first amount of base and water, where the amount of base neutralizes less than all of the acid groups present on the resin and is sufficient to form an emulsion, (b) adding a second amount of base to obtain a neutralization ratio of from about 100% to about 200%, and (c) converting the emulsion of step (b) into latex particles by the addition of water and mechanical mixing.

In embodiments, latex particles produced in the above method are less than about 200 nm in size.

In embodiments, liquids from the latex are separated from the resin particles and are reused in a subsequent PIE. In embodiments, two portions of liquids are obtained from a latex, a first portion comprises primarily solvents and a second portion comprises primarily water. Hence, the obtained first portion can be used to dissolve resin as in step (a) of the method above. The obtained second portion can be added to the dissolved resin to form a water-in-oil emulsion as provided in step (a) above. The obtained second portion also can be to the emulsion of steps (a) and (b) to induce phase inversion and to form an oil-in-water emulsion, a latex.

DETAILED DESCRIPTION

Latex emulsions of polyester resins may be produced using a PIE process in which resins are dissolved in, for example, dual solvents (MEK and IPA), neutralized with certain amounts of a base and mixed with water to create a homogeneous W/O dispersion (water droplets dispersed in continuous oil phase) or emulsion. Subsequently, additional water is added to invert the dispersion into a stable O/W latex. Organic solvents are removed and surfactant and preservatives may be added to provide a stable latex. That latex then may be used for various purposes including making toner, for example, in an emulsion aggregation (EA) method.

Properties of crystalline resin, such as acid value and molecular weight, influence emulsification and final latex particle size and size distribution. IPA can behave as a medium to improve compatibility between MEK and water. While not being bound by theory, in the local interface between solvents and water, the size and number of polyester molecules that relocate and localize in MEK-rich areas can contribute to final latex particle size. In other words, chains neutralized by base, such as, ammonia, as determined by the neutralization ratio calculated according to Equation 1 based on resin acid value, determine latex panicle size. In Equation 1, acid value of resin is the only independent variable adjusted by ammonia (or other base) amount to achieve a specific neutralization ratio for desirable particle size, such as, less than about 200 nm. Hence, a correlation between resin acid value and desired neutralization ratio is provided for use with essentially any resin where acid value is provided or can be calculated practicing known materials and methods.

$$10\% \ NH_3 = \text{neutralization ratio} * \text{amount of resin in parts} * \text{acid value} * 0.303 * 0.01 \quad \text{(Equation 1)}$$

While manipulation of base concentration, ammonia in the formula above, may be used to control particle size, acid value of resin varies from lot to lot requiring additional testing of each resin lot prior to toner production. In solvent reuse PIE, distillate 1, the solvent-rich mixture from a prior PIE reaction is used to dissolve resin in a subsequent PIE process rather than using fresh solvent and DIW. Distillate 1 consists of organic solvent(s), such as, MEK and IPA, water and base, such as, ammonia. But, as the operating temperature of PIE often is about 65° C., recovery of water and base, such as, ammonia, can be variable. The variable amounts of base result in inconsistency of resulting particle size. Thus, a more robust PIE formula or process with less sensitivity to base concentration or amount is desired.

In embodiments, a novel PIE formula is disclosed, which is more robust to account for varying base content, to produce a crystalline latex accommodating variation of acid value resulting in minimal variability of particle size. Minimal size variation of latex particles helps formation of uniform toner particles during EA processes leading to improved print quality, lower toner usage and lower energy usage in printing. Hence, using a neutralization ratio of between about 100% to about 200%, such as, about 150% to about 170%, yields uniform populations of resin particles less than about 200 nm, less than about 190 nm in size using resin with an acid value or number between, for example, from about 9.5 to about 11.

In embodiments, by rearranging Equation 1 and solving for acid value, it was determined that employing the above range of neutralization ratio, uniform populations of smaller sized resin particles of less than about 200 nm are obtained using resins of defined acid value, such as, between about 9.5 to about 11.

Any suitable crystalline resin containing acid groups may be used. Any suitable base reagent may be used in the process disclosed herein. In embodiments, the base may be ammonia or ammonium hydroxide. Other base reagents, such as, KOH, NaOH, NaHCO$_3$, Na$_2$CO$_3$ and the like may be used.

The resulting resin particles optionally can be washed, for example, with deionized water (DIW), then dried or suspended in a fluid, such as, DIW, to form a latex.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating," and, "matching," or grammatic variations thereof, have generally acceptable definitions or at the least, are understood to have the same meaning as, "about."

As used herein, "solvent reuse," is meant to include a primarily solvent portion of a PIE O/W emulsion as well as a primarily water portion of the O/W emulsion. The O/W emulsion can be configured to include solvents with, for example, boiling point(s) or other physical property different from that of water so that the solvents and water can be removed as different fractions from the O/W emulsion leaving the latex or resin particles for use, for example, in toner. Generally, the solvent portion includes the organic solvent(s) used to dissolve the resin as well as amounts of basic neutralizing agent and any optional surfactant, and possibly a trace or small amount of water. The water portion is dominated by water but can include small amounts of organic solvent(s), basic neutralizing agent and any optional surfactant. The solvent portion can be used as the organic mixture for dissolving resin in a subsequent PIE. The water portion can be used as the aqueous mixture for phase inversion in a subsequent PIE.

"Distillate," is used herein, as known, to include fluid removed from a liquid, for example, at elevated temperature, by a distillation process, which can occur under reduced pressure, such as, a vacuum, but also to include any fluid removed from an O/W emulsion resulting from PIE by any separation means or method, such as, chromatography, filtration, centrifugation and so on. Hence, a liquid phase, a solution, a fraction, a supernatant and so on is identical to and synonymous with a distillate herein. Thus, a distillate identifies and is a filtrate, a fraction and so on. The liquid portions removed from the O/W emulsion are reused and are of at least two classes, the first is organic solvent-rich, that is, more than about 50% by weight or volume is organic solvent(s), and is used to dissolve resin in a subsequent PIE, which first portion can be supplemented with fresh reagent(s), such as, an organic solvent, base and so on, as needed or as a design choice, for resin dissolution; and a second portion is water-rich, that is, more than 50% by weight or volume is water, and is used in a subsequent PIE, which second portion can be supplemented with water, neutralizing agent and so on, as needed or as a design choice, to produce phase inversion of the W/O emulsion of a PIE into an O/W emulsion, which contains latex. The first portion is synonymous with, "solvent portion," "organic mixture," or, "Distillate I." The second portion is synonymous with, "water portion," "aqueous mixture," or, "Distillate II."

A polymer can be identified or named herein by the one or more of the constituent monomers used to construct the polymer, even though following polymerization, a monomer can be altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester.

By, "two dimension," or grammatic forms thereof, such as, 2-D, is meant to relate to a structure or surface that is substantially without measurable or discernible depth, without use of a mechanical measuring device. Generally, the surface is identified as flat, and emphasizes height and width, and lacks the illusion of depth or thickness. Thus, for example, toner is applied to a surface to form an image or coating and generally, that layer of fused toner is from about 1 µm to about 10 µm in thickness. Nevertheless, that application of toner to a flat surface is considered herein as a two dimensional application. The surface can be a sheet or a paper, for example. This definition is not meant to be a mathematic or scientific definition at the molecular level but one which to the eye of the viewer or observer, there is no illusion of thickness. A thicker layer of toner, such as one which might be identified as providing, "raised lettering," on a surface is for the purposes herein, included in the definition of 2-D.

By, "three dimension," or grammatic forms thereof, such, as, 3-D, is meant to relate to a structure composed of plural layers or particle depositions of toner that aggregate or assemble to yield a form, a shape, a construct, an object and the like that, for example, need not be applied to a surface or structure, can be autonomous and/or has a thickness or depth. Printing as used herein includes producing 3-D structures. Printing on a surface or structure also is used herein to include forming a 3-D structure by deposition of plural layers of toner. Often, the first layer is printed on a support, surface, substrate or structure. Successive layers of toner are placed thereon and the already deposited (and optionally adhered or solidified) toner layer or layers is considered herein a surface or a substrate.

Currently, ultralow melt (ULM) polyester toners result in a benchmark minimum fix temperature (MFT) which is reduced by about 20° C. as compared to that of a conventional emulsion aggregation (EA) toner, which can be about 150° C. In embodiments, an ULM toner of the present disclosure may have an MFT of from about 100° C. to about 130° C., from about 105° C. to about 125° C., from about 110° C. to about 120° C.

"Acid value," is used synonymously with, "acid number," which can be calculated as taught herein or as known in the art.

Resins

Any resin may be utilized in forming a latex emulsion. The resin may be an amorphous resin or a crystalline resin. The resin may be a polyester resin, including the resins described, for example, in U.S. Pat. Nos. 6,593,049 and 6,756,176, the disclosure of each of which herein is incorporated by reference in entirety.

The resin may be a polyester resin formed by reacting a polyol with a polyacid in the presence of an optional catalyst.

The polyol may be, for example, selected in an amount of from about 40 to about 60 mole percent, from about 42 to about 55 mole percent. The polyacid may be selected in an amount of, for example, from about 40 to about 60 mole percent, from about 42 to about 52 mole percent.

Polycondensation catalysts may be utilized in forming either the crystalline or amorphous polyesters and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole percent to about 5 mole percent based on the starting polyacid or polyester used to make the polyester resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as, poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

Other suitable resins that can be used to make a latex comprise a styrene, an acrylate, such as, an alkyl acrylate, such as, methyl acrylate, ethyl acrylate, butyl acrylate, isobutyl acrylate, dodecyl acrylate, n-octyl acrylate, n-butylacrylate, 2-chloroethyl acrylate; β-carboxy ethyl acrylate (β-CEA), phenyl acrylate, methacrylate, butadienes, isoprenes, acrylic acids, acrylonitriles, styrene acrylates, styrene butadienes, styrene methacrylates, and so on, such as, methyl α-chloroacrylate, methyl methacrylate, ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone, methyl isopropenyl ketone and the like; vinylidene halides, such as, vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and mixtures thereof. A mixture of monomers can be used to make a copolymer, such as, a block copolymer, an alternating copolymer, a graft copolymer and so on.

An amorphous resin or combination of amorphous resins utilized in the latex may have a glass transition temperature ($T_g$) of from about 30° C. to about 80° C. from about 35° C. to about 70° C. In embodiments, the combined resins utilized in the latex may have a melt viscosity of from about 10 to about 1,000,000 Pa*S at about 130° C., from about 50 to about 100,000 Pa*S at about 130° C.

One, two or more resins may be used. In embodiments, when two resins are used, the resins may be in any suitable ratio (e.g., weight ratio), such as, of from about 1% (first resin)/99% (second resin) to about 99% (first resin)/1% (second resin), in embodiments, from about 10% (first resin)/90% (second resin) to about 90% (first resin)/10% (second resin).

The weight ratio of the two amorphous resins may be from about 10% first amorphous resin/90% second amorphous resin, to about 90% first amorphous resin/10% second amorphous resin.

In embodiments, the resin may possess acid groups which, in embodiments, may be present at the terminus of a resin. Acid groups which may be present include carboxylic acid groups and the like. The number of acid groups may be controlled by adjusting the materials utilized to form the resin and reaction conditions.

In embodiments, the resin may be a polyester resin, in embodiments, a crystalline resin, having an acid number (or acid value) from about 2 mg KOH/g of resin to about 200 mg KOH/g of resin, from about 5 mg KOH/g of resin to about 50 mg KOH/g of resin, from about 10 mg KOH/g of resin to about 15 mg KOH/g of resin, although the value can be within, overlapping, nested or outside of those ranges. The acid-containing resin may be dissolved in an organic solvent, for example, a tetrahydrofuran solution or isopropanol, and the acid number may be determined by, for example, titration with KOH/methanol solution containing phenolphthalein as indicator and determining the amount of KOH needed to neutralize the resin.

Resin particles of interest can be no greater than about 200 nm in size, less than about 190 nm, less than about 180 nm or smaller that is, are about 200 nm or smaller, about 185 nm or smaller, about 175 nm or smaller in size, although a size outside of those ranges is acceptable.

Solvent

Any suitable organic solvent may be used to dissolve resin, for example, alcohols, esters, ethers, ketones, amines and combinations thereof, in an amount of, for example, from about 30% by weight to about 400% by weight of resin, from about 40% by weight to about 250% by weight of resin, from about 50% by weight to about 100% by weight of resin.

In embodiments, suitable organic solvents, include, for example, methanol, ethanol, propanol, IPA, butanol, ethyl acetate, MEK and combinations thereof. In embodiments, the organic solvent may be immiscible in water and may have a boiling point of from about 30° C. to about 120° C. In embodiments when at least two solvents are used, the ratio of solvents can be from about 1:2 to about 1:15, from about 1:3 to about 1:10, from about 1:3.5 to about 1:7.5. Thus, if the first solvent is IPA and the second solvent is MEK, the ratio of IPA to MEK can be, for example, about 1:4.

Neutralizing Agent

In embodiments, resin is mixed with a base or a neutralizing agent. In embodiments, neutralizing agent neutralizes resin acid groups. Thus, a neutralizing agent herein may also be referred to as a, "basic agent," "basic neutralization agent," "base," or grammatic forms thereof. Any suitable basic neutralization reagent may be used in accordance with the present disclosure. In embodiments, suitable basic neutralization agents may include both inorganic basic agents or organic basic agents. Suitable basic agents may include ammonia, ammonium hydroxide, potassium hydroxide, sodium hydroxide, sodium carbonate, sodium bicarbonate, lithium hydroxide, potassium carbonate, combinations thereof and the like. A buffer can be used.

A basic agent may be in an amount of from about 0.001% to about 50%, from about 0.01% to about 25%, from about 0.1% to about 5% by weight of a resin. In embodiments, a neutralizing agent may be added as an aqueous solution. In embodiments, the neutralizing agent may be added in the form of a solid. In embodiments, plural forms of bases are used in a process of interest. Hence, a process can comprise a first base and at a different or successive step, a second base is used. The first and second bases can be the same or different. In any event, a suitable amount of base is used to achieve the desired neutralization ratio.

A neutralization ratio of from about 100% to about 200% may be achieved, from about 110% to about 190%, from about 120% to about 180%, from about 130% to about 180%, from about 140% to about 180%, from about 150% to about 180%, from about 150% to about 170%, from about 110% to about 170%, from about 120% to about 170%, from about 130% to about 170%, from about 140% to about 150% or other ranges contained with the maximal range recited herein may be obtained in the practice of the subject matter of interest. The neutralization ratio may be calculated as the molar ratio of basic groups provided with the basic neutralizing agent to the acid groups present in the resin multiplied by 100%.

Surfactants

In embodiments, the process of the present disclosure optionally may include adding a surfactant, for example, before or during combining reagents, to the resin at an elevated temperature, in an emulsion, in a dispersion and so on.

Where utilized, an emulsion may include one, two or more surfactants. The surfactants may be selected from ionic surfactants and nonionic surfactants. Anionic surfactants and cationic surfactants are encompassed by the term, "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so is present in an amount of from about 0.01% to about 20% by weight of the resin, from about 0.1% to about 10% by weight.

Processing

The present process comprises forming a mixture by any known means, optionally, at an elevated temperature above room temperature (RT), containing at least one crystalline resin, at least one organic solvent, optionally a surfactant and a neutralizing agent to form a latex emulsion.

In embodiments, the elevated temperature may be a temperature near to or above the $T_g$ of the resin(s).

In embodiments, an emulsion formed in accordance with the present disclosure includes water, in embodiments, deionized water (DIW) in amounts and at temperatures that melt or soften the resin, of from about 25° C. to about 120° C., from about 35° C. to about 80° C.

Thus, in embodiments, a process of interest may include contacting at least one crystalline resin with an organic solvent to form a resin mixture, optionally heating the resin mixture to an elevated temperature, stirring the mixture, adding a first portion of a neutralizing agent to neutralize some of the acid groups of the resin and water, then adding a second portion of a neutralizing agent and water to the mixture until phase inversion occurs to form a phase inversed latex emulsion, treating the latex to remove organic solvent and water to produce a latex, such as, with a low polydispersity, a lower percentage of fines, a lower percentage of coarse particles, a smaller particle size, a robust method for obtaining resin particles of desired size, a reproducible method for obtaining resin particles of desired size and so on.

In the phase inversion process, resin, such as, an amorphous, a crystalline or a combination of at least one amorphous and crystalline resins may be dissolved in a low boiling point organic solvent, which solvent is miscible or partially miscible with water, such as, MEK, and any other solvent noted hereinabove, at a concentration of from about 1% by weight to about 75% by weight resin to solvent, from about 5% by weight to about 60% by weight resin in solvent. The resin mixture then can be heated to a temperature of from about 25° C. to about 90° C., from about 30° C. to about 85° C. The heating need not be held at a constant temperature, but may be varied. For example, the heating may be increased slowly or incrementally until a desired temperature is achieved.

In accordance with processes as disclosed, a latex may be obtained using a more than one solvent PIE process which requires dispersing, phase inversing and removing steps. In that process, the resin may be dissolved in a combination of more than one organic solvents, for example, MEK and IPA, to produce a uniform organic mixture containing dissolved resin. Also, the fluids from one PIE process can be removed and reused in a subsequent PIE.

The organic solvents remain in both the resin particles and water phase following phase inversion. The liquid reagents can be removed from the O/W emulsion and from the resin particles practicing known materials and methods. Through vacuum distillation, for example, the organic solvent(s) can be stripped, and if the boiling point(s) of the organic solvent(s) is distinguishable from that of water, a portion of the water (as well as other water soluble compounds) can be distilled from the remaining emulsion or incipient latex.

In embodiments, the ratio of resin to two or more solvents (for example, MEK and IPA) may be from about 10:8 to about 10:12, from about 10:8.5 to about 10:11.5, from about 10:9 to about 10:11. When two solvents are used, and a low molecular weight (LMW) resin is included, the ratio of the LMW resin to the first and to the second solvents can be from about 10:6:1.5 to about 10:10:2.5. When a high molecular weight (HMW) resin is included with two solvents, the ratio of the HMW resin to the first and to the second solvents can be from about 10:8:2 to about 10:11:3, although amounts outside of those ranges noted above can be used.

The mixing temperature may be from about 35° C. to about 100° C., from about 40° C. to about 90° C., from about 50° C. to about 70° C.

Once the resins, neutralizing agent and optional surfactant are combined, the mixture then may be contacted with a first portion of a water, to form a W/O emulsion. Water and the second portion of a neutralization agent then are added to form an O/W emulsion including a latex with a solids content of from about 5% to about 60%, from about 10% to about 50%. While higher water temperatures may accelerate dissolution, latexes may be formed at temperatures as low as RT. In embodiments, water temperatures may be from about 40° C. to about 110° C., from about 50° C. to about 90° C.

The amount of water comprising the first portion of water is an amount suitable to form a W/O emulsion. Phase inversion can occur at about a 1:1 w/w or v/v ratio of organic phase to aqueous phase. Hence, the first portion of water generally comprises less than about 50% of the total volume or weight of the final emulsion.

Phase inversion occurs on adding an aqueous alkaline solution or basic agent, optional surfactant and second portion of water to create a phase inversed emulsion including a dispersed phase of droplets possessing the molten ingredients of the resin composition and a continuous phase including any surfactant, the base and water, where the second portion of water attains the phase inversion point (PIP) to form an O/W emulsion.

Combining may be conducted, in embodiments, utilizing any means within the purview of those skilled in the art. For example, combining may be conducted in a glass kettle with an anchor blade impeller, an extruder, i.e., a twin screw extruder, a kneader, such as, a Haake mixer, a batch reactor or any other device capable of intimately mixing viscous materials to create near or homogenous mixtures. The reaction can occur in a continuous reactor or a microreactor.

Stirring, although not necessary, may be utilized to enhance formation of the latex. Any suitable stirring device may be utilized. In embodiments, the stirring may be at a speed of from about 10 revolutions per minute (rpm) to about 5,000 rpm, from about 20 rpm to about 2,000 rpm, from about 50 rpm to about 1,000 rpm. The stirring need not be at a constant speed and may be varied. For example, as the heating of the mixture becomes more uniform, the stirring rate may be increased or decreased. In embodiments, a homogenizer (that is, a high shear device), may be utilized to form the phase inversed emulsion. When utilized, a homogenizer may operate at a rate of from about 3,000 rpm to about 10,000 rpm.

Although the PIP may vary depending on the components of the emulsion, the temperature of heating, the stirring speed and the like, phase inversion may occur when the basic neutralization agent, optional surfactant and water are added so that the resulting resin is present in an amount from about 5% by weight to about 70% by weight of the emulsion, from about 20% by weight to about 65% by weight, from about 30% by weight to about 60% by weight of the emulsion; or when the amount of water exceeds the amount of organic solvent(s).

Following phase inversion, additional optional surfactant, water and optional aqueous alkaline solution may be added to dilute the phase inversed emulsion, although not required. Following phase inversion, the emulsion may be cooled to RT, for example, from about 20° C. to about 25° C.

In embodiments, separation methods, such as, distillation, optionally with stirring, optionally under a vacuum, of the O/W emulsion may remove organic solvent(s) and optionally, water, to provide resin particles with an average diameter size of less than about 200 nm, less than about 195 nm, less than about 190 nm.

Desired properties of a resin emulsion (i.e., particle size and low residual solvent level) may be achieved by adjusting solvent and neutralizer concentration and process parameters (i.e., reactor temperature, vacuum and process time).

The coarse content of the latex of the present disclosure, that is, particles that are larger than most prevalent or desired population of particles, may be from about 0.01% by weight to about 5% by weight, from about 0.1% by weight to about 3% by weight. The coarse content can be determining practicing known materials and methods, such as, using a Nanotrac analyzer or a Beckman Coulter MULTISIZER to obtain, for example, a cumulative size distribution of a particle population and from a graphical representation of the population obtain the $D_{84V}/D_{50V}$ ratio as a measure of the amount of coarse particles based on a statistical consideration of the population parameters and under certain statistical conditions, such as, confidence limits, standard deviation and so on, as known in the art.

The resin particles can be washed with DIW one or more times. The resin particles can be dried or stored in a fluid, such as, DIW.

As disclosed hereinabove, in the case of crystalline resins, resins comprising an acid value of from about 9.5 to about 11, from about 9.6 to about 11, from about 9.7 to about 10.9, from about 9.8 to about 10.8, from about 9.9 to about 10.7, and the base, such as, ammonia, used to obtain a neutralization ratio of from about 150% to about 170%, from about 150% to about 169%, from about 151% to about 168%, from about 152% to about 167%, from about 153% to about 166% will yield populations of particles of $D_{50}$ size of less than about 200 nm ($D_{50}$ is the median diameter, and is the medium value of the particle size distribution, that is, the particle diameter at 50% of the cumulative distribution with particle size plotted against cumulative number,) less than about 190 nm, less than about 180 nm or smaller. As used herein, particle size relates to the $D_{50}$ value of a population.

Toner

Latex may be utilized to form a toner by any method within the purview of those skilled in the art. The latex emulsion may be contacted with an optional other resin, an optional colorant, optionally in a dispersion, an optional wax and other additives to form a toner by a suitable process, in embodiments, an EA and coalescence process.

Suitable resins may include a mixture of an amorphous polyester resin and a crystalline polyester resin as described in U.S. Pat. No. 6,830,860, the entire disclosure of which herein is incorporated by reference in entirety. Suitable resins may include a mixture of HMW amorphous and LMW amorphous polyester resins.

The crystalline resin may be present, for example, in an amount of from about 1 to about 50 percent by weight of the toner components, from about 5 to about 35 percent by weight of the toner components. The crystalline resin may possess various melting points of, for example, from about 30° C. to about 120° C., from about 50° C. to about 90° C. The crystalline resin may have a number average molecular weight ($M_n$), as measured by gel permeation chromatography (GPC) of, for example, from about 1,000 to about 50,000, from about 2,000 to about 25,000, and a weight average molecular weight ($M_w$) of, for example, from about 2,000 to about 100,000, from about 3,000 to about 80,000, as determined by GPC. The molecular weight distribution ($M_w/M_n$) or polydispersity index of the crystalline resin may be, for example, from about 2 to about 6, from about 3 to about 5.

In embodiments, a suitable toner of the present disclosure may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20% crystalline resin.

As used herein, a high molecular weight (HMW) amorphous resin may have an $M_w$ of from about 35,000 to about 150,000, from about 45,000 to about 140,000, and a low molecular weight (LMW) amorphous resin may have an $M_w$ of from about 10,000 to about 30,000, from about 15,000 to about 25,000.

Colorants

One or more colorants may be added, and various known suitable colorants, such as dyes, pigments, mixtures of dyes, mixtures of pigments, mixtures of dyes and pigments, and the like, may be included in the toner. In embodiments, the colorant, when present, may be included in the toner in an amount of, for example, 0 (clear or colorless) to about 35% by weight of the toner, although the amount of colorant can be outside of that range.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CBS5600™, MCX6369™; Bayer magnetites, BAYFEROX 8600™, 8610™; Northern Pigments magnetites, NP-604™, NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment or pigments are generally used as water-based pigment dispersions.

Wax

Optionally, a wax also may be used in forming toner particles. The wax may be provided in a wax dispersion, which may include a single type of wax or a mixture of two or more different waxes.

When included, the wax may be present in an amount of, for example, from about 1% by weight to about 25% by weight of the toner particles, from about 5% by weight to about 20% by weight of the toner particles, although the amount of wax can be outside of those ranges. Waxes that may be selected include waxes having, for example, an average molecular weight of from about 500 to about 20,000, from about 1,000 to about 10,000.

Waxes that may be used include, for example, polyolefins, such as, polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, naturally occurring waxes such as those obtained from plant sources or animal sources, and polybutene waxes. Mixtures and combinations of the foregoing waxes may also be used, in embodiments. In embodiments, the waxes may be crystalline.

In embodiments, the wax may be incorporated into the toner in the form of one or more aqueous emulsions or dispersions of solid wax in water, optionally, with a surfactant, where the solid wax particle size may be in the range of from about 100 to about 500 nm.

Toner Preparation

The toner particles may be prepared by any method within the purview of one skilled in the art. Although embodiments relating to toner particle production are described below with respect to EA processes, any suitable method of preparing toner particles may be used, including, chemical processes, such as, suspension and encapsulation processes disclosed in U.S. Pat. Nos. 5,290,654 and 5,302,486, the disclosure of each of which herein is incorporated by reference in entirety.

In embodiments, toner compositions may be prepared by EA processes, such as, a process that includes aggregating a mixture of an optional colorant, an optional wax and any other desired or required additives, and emulsions including the resins described above, optionally in surfactants as described above, and then coalescing the aggregated particles. A mixture may be prepared by adding an optional colorant and optionally a wax or other materials, which optionally also may be in a dispersion including a surfactant to produce an emulsion comprising resin. The pH of the resulting mixture may be adjusted by an acid such as, for example, acetic acid, nitric acid and the like. The pH of the mixture may be adjusted to from about 2 to about 5. Additionally, in embodiments, the mixture may be homogenized. If the mixture is homogenized, that may be by mixing at about 600 to about 6,000 rpm. Homogenization may be accomplished by any suitable means, including, for example, an IKA ULTRA TURRAX T50 probe homogenizer.

Following preparation of the above mixture comprising toner-forming reagents, an aggregating agent may be added to the mixture. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof.

In embodiments, the aggregating agent may be added to the mixture at a temperature that is below the $T_g$ of the resin(s). The aggregating agent may be added to the mixture in an amount of, for example, from about 0.1% to about 10% by weight, from about 0.2% to about 8% by weight of the resin in the mixture.

The particles may be permitted to aggregate until a desired particle size is obtained. Particle size can be monitored during the growth process, for example, with a COULTER COUNTER, for average particle size. The aggregation may proceed by maintaining the elevated temperature or slowly raising the temperature to, for example, from about 40° C. to about 100° C., and holding the mixture at that temperature for a time of from about 0.5 hours to about 6 hours, from about 1 hour to about 5 hours, while maintaining stirring, to provide the aggregated particles. Once the desired size is reached, an optional shell resin can be added.

Once the desired final size of the toner particles is achieved, the pH of the mixture may be adjusted with a base or a buffer to a value of from about 3 to about 10, from about 5 to about 9. The adjustment of the pH may be utilized to freeze, that is, to stop toner particle growth. The base utilized to stop toner growth may include any suitable base, such as, for example, alkali metal hydroxides, such as, for example, sodium hydroxide, potassium hydroxide, ammonium hydroxide, combinations thereof and the like. In embodiments, a compound, such as, ethylene diamine tetraacetic acid (EDTA) or functionally equivalent compound, may be added to help adjust the pH to the desired values noted above.

Shell

In embodiments, after aggregation, but prior to coalescence, a resin coating may be applied to the aggregated particles to form a shell thereover. Any one or more resins may be utilized as the shell.

A shell resin may be applied to aggregated particles by any method within the purview of those skilled in the art. In embodiments, resins utilized to form a shell may be in an emulsion, including any surfactant described above. An emulsion may comprise resins, as known in the art or as described above.

Formation of a shell over aggregated particles may occur while heating to a temperature of from about 30° C. to about 80° C., from about 35° C. to about 70° C. Formation of a shell may take place for a period of time of from about 5 min to about 10 hr, from about 10 min to about 5 hr.

A shell may be present in an amount of from about 10% by weight to about 40% by weight of latex particles, from about 20% by weight to about 35% by weight of latex particles, although amounts outside of those ranges can be used.

In embodiments, final size of toner particles may be less than about 8 µm, less than about 7 µm, less than about 6 µm in size.

Coalescence

Following aggregation to a desired particle size and application of any optional shell, particles then may be coalesced to a desired final shape, coalescence being achieved by, for example, heating a mixture to a temperature of from about 45° C. to about 100° C., from about 55° C. to about 99° C., which may be at or above the $T_g$ of resin(s) utilized to form toner particles. Coalescence may be accomplished over a period of from about 0.01 to about 9 hours, from about 0.1 to about 4 hours.

After aggregation and/or coalescence, a mixture may be cooled to RT. The cooling may be rapid or slow, as desired. A suitable cooling method may include introducing cold water to a jacket around a reactor. After cooling, toner particles optionally may be washed with water and then dried. Drying may be accomplished by any suitable method for drying, including, for example, freeze drying.

Additives

In embodiments, toner particles may contain other optional additives, as desired or required. For example, toner may include positive or negative charge control agents, for example, in an amount of from about 0.1 to about 10% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which herein is incorporated by reference in entirety; organic sulfate and sulfonate compositions, including those disclosed in U.S. Pat. No. 4,338,390, the disclosure of which herein is incorporated by reference in entirety; cetyl pyridinium tetrafluoroborates; distearyl dimethyl ammonium methyl sulfate; aluminum salts, such as, BONTRON E84™ or E88™ (Orient Chemical Industries, Ltd.); combinations thereof and the like.

There can also be blended with toner particles external additive particles after formation including flow aid additives, which additives may be present on the surface of toner particles. Examples of additives include metal oxides, such as, titanium oxide, silicon oxide, aluminum oxides, cerium oxides, tin oxide, mixtures thereof and the like; colloidal and amorphous silicas, such as, AEROSIL®, metal salts and metal salts of fatty acids inclusive of zinc stearate and calcium stearate, or long chain alcohols, such as, UNILIN 700, and mixtures thereof.

Each external additive may be present in an amount of from about 0.1% by weight to about 5% by weight of toner, from about 0.25% by weight to about 3% by weight of toner, although amount of an additive can be outside of those ranges.

Suitable additives include those disclosed in U.S. Pat. Nos. 3,590,000, 3,800,588 and 6,214,507, the disclosure of each of which herein is incorporated by reference in entirely.

In embodiments, dry toner particles having a shell of the present disclosure, exclusive of external surface additives, may have the following characteristics: (1) volume average diameter (also referred to as, "volume average particle diameter,") of from about 3 to about 25 µm; (2) number average geometric size distribution $(GSD_n)$ and/or volume average geometric size distribution $(GSD_v)$ of from about 1.05 to about 1.55; and (3) circularity of from about 0.93 to about 1, (as measured with, for example, a Sysmex FPIA 2100 analyzer). Characteristics of toner particles may be determined by any suitable technique and apparatus, such as, a Beckman Coulter MULTISIZER 3.

A toner of interest comprising a crystalline resin produced as described herein may be used in any known xerographic or electrophotographic device, or other imaging device. A toner of interest can be a low melt toner or an ULM toner.

Color printers commonly use one to four, or more housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut) and to provide a clear coat or coating.

Thermoplastic and thermosetting styrene and acrylate polymers can be used for 3-D printing by any of a variety of materials and methods, such as, selective heat sintering, selective laser sintering, fused deposition modeling, robocasting and so on. The resin can be formed into sheets for use in laminated object manufacturing. In embodiments, the resin is configured as a filament. Granular resin can be used in selective laser melting methods. Ink jet devices can deliver resin.

Examples of polymers for such uses include acrylonitrile butadiene styrene, polyethylene, polymethylmethacrylate, polystyrene and so on. In embodiments, the polymers can be mixed with an adhesive to promote binding. In embodiments, an adhesive is interleaved with a layer of cured or hardened polymer to bind leafs or layers.

A polymer may be configured to contain a compound that on exposure to a stimulant decomposes and forms one or more free radicals, which promote polymerization of a polymer of interest, such as, forming branches, networks and covalent bonds. For example, a polymer can comprise a photoinitiator to induce curing on exposure to white light, an LED, UV light and so on. Such materials can be used in stereolithography, digital light processing, continuous liquid interface production and so on.

Waxes and other curing material can be incorporated into a 3-D composition or can be provided as a separate composition for deposition on a layer of a resin of interest or between layers of a resin of interest.

For example, a selective laser sintering powder, such as, a polyacrylate or polystyrene, is placed in a reservoir atop of a delivery piston. Granular resin is transferred from the reservoir to a second void comprising a fabrication piston which carries the transferred resin in the form of a thin layer. The thin layer is then exposed to a light or a laser tuned to melt and to fuse selected sites of the layer of resin particles. A second layer of resin granules is added from the reservoir to the fabrication void and the laser again melts and fuses selected portions of the layer of granules. The heating and fusion is of an intensity and strength to enable heating and fusing of sites from the second layer to sites of the first layer, thereby forming a growing solid structure in the vertical direction. In embodiments, an adhesive is applied to the fused first layer before the unfused granular resin for the second layer is applied. When completed, the unfused resin powder is removed leaving the fused granules in the form of a designed structure. Such a manufacturing method is an additive process as successive layers of the structure are laid down consecutively.

In embodiments the surface is 2-D (e.g., paper or a label) or 3-D (medical device, such as, a catheter or thermometer). In embodiments, the antibacterial printed image is a clear coat formed with a clear toner (colorless) and applied over a surface to provide an antimicrobial coating on the surface. The clear coat may be applied over an earlier printed or flat image or may be applied as a coating to a 3-dimensional surface, such as, a medical instrument. In embodiments, the antimicrobial printed image is formed with a color toner to provide an antimicrobial image, such as, a label or UPC code. The color antimicrobial printed image may be a printed code, a printed text, or a printed logo.

The toner may be applied to a surface by fusing at a temperature that adheres the toner to the surface, but does not diminish or destroy the antimicrobial properties of the toner, see Example 5. In embodiments, the toner is fused at a temperature from about 80° C. to about 130° C., less than about 125° C., less than about 120° C., less than about 115° C., or lower.

In embodiments, the toner is one which is amenable to fusing without elevated temperatures, a cold fusing process, that can rely on pressure alone, for example, to fuse toner to a surface or to a substrate.

In embodiments, the surface is selected from a paper, a plastic, a textile, a ceramic, a metal, a rock and so on. The antimicrobial printed image, color or clear coat, may be affixed to a menu, a medical device, medical equipment, food packaging, cosmetic packaging, cosmetic products, food preparation products, kitchen products, heating or cooling ductwork, building materials, insulation products, or clean room surfaces.

The subject matter now will be exemplified in the following non-limiting examples. Parts and percentages are by weight unless otherwise indicated.

EXAMPLES

Example 1

PIE of Crystalline Resin Using Dual Solvents

The crystalline resin was a polyester made of seven units each of alternating dodecanedioic acid and 1,11-undecanediol monomers. The resin had an $M_w$ of about 24.2 Kpse, $M_p$ of about 22.8 Kpse, $M_n$ of about 9 Kpse, $M_z$ of about 37.6 Kpse and a PDI of about 2.7. (Gel permeation chromatography was used to determine shape, weight and size, using, for example, agarose or polyacrylamide gels. The standards used were a set of graded polystyrene polymers of known weight in g/mol. Hence, the size and measurement of a molecule is in reference to equivalent migration of the known polystyrene molecules and is provided in terms of polystyrene equivalents or pse, and for larger molecules, kilopse or kpse.) The $T_m$ of the resin was about 75.1° C. The acid value of the resin varied from batch to batch. Resins from several batches were combined and had an aggregate acid value of 10.425. The resin was dissolved in MEK and IPA, and neutralized with ammonia using the amounts as provided in Table 1 below. Neutralization ratio, calculated from Equation 1 based on the acid value, was the only variable. Particle size was measured using a Nanotrac instrument. Thus, 5.455 parts MEK and 0.636 parts IPA were used to dissolve the polyester resin. A portion (4.545 parts) of water was added to promote polyester dissolution in the dual solvents. After neutralization of the polyester with the second portion of ammonia (Ammonia II), 13.636 parts of water were added slowly with a constant addition rate to convert the resin dissolution into latex at 65° C.

TABLE 1

Dual solvent formulation.

| Chemicals | Parts |
| --- | --- |
| Resin | 10 |
| MEK | 5.455 |
| IPA | 0.636 |
| Ammonia (I) | 0.200 |
| DIW (I) | 4.545 |
| Ammonia (II) | 0.284-0.324 |
| DIW (II) | 13.636 |
| Total | 34.756-34.796 |

Neutralization ratio as determined by the total amount of ammonia (I) and (II), was the only variable. Ammonia (I) was used at 0.2 parts and ammonia (II) varied from 0.284 parts up to 0.324 parts without varying the amounts of the remaining reagents. The neutralization ratio, based on total ammonia amount, ranged from 153.2% to 165.9%.

Particle size using different neutralization ratios are listed in Table 2.

TABLE 2

Particle size as a function of neutralization ratio.

| Sample ID | Neutralization Ratio (%) | $D_{50}$ (nm) | $D_{95}$ (nm) | width (nm) |
| --- | --- | --- | --- | --- |
| 1 | 153.2 | 193 | 401.0 | 178.5 |
| 2 | 157.3 | 180 | 377.0 | 172.9 |
| 3 | 159.0 | 169 | 346.0 | 141.1 |
| 4 | 165.9 | 194 | 445.0 | 217.6 |

In further experiments, a neutralization ratio of 153.6 yielded particles of $D_{50}$ of 193.3 nm, 157.7 yielded 175.6 nm particles and 159.4 yielded 168.7 nm particles.

It was observed that particle size, $D_{50}$, is relatively stable (184±11.8 nm) and within a desired size of 145 nm to 195 nm with the neutralization ratios used and a crystalline resin with an acid number of 10.425.

In latex manufacturing, it is preferred to keep factors (solvent ratio, water addition rate and ammonia amount) constant to ensure a simple, robust and reproducible process. Therefore, in the example, acid value is the only variable in the PIE process. It was observed that particle size of a resin with an acid number of 10.425 is stable and independent of neutralization ratio when neutralization ratio is between about 150% to about 170%.

When ammonia amount is used to obtain the particular neutralization ratios of interest, the acid value of resins may be calculated via Equation 2, obtained by rearranging Equation 1. That enables foreknowledge of the range of acid values which can be used to generate reproducibly and with minimal intervention, latex particles of desired size.

Acid Value=(10% NH$_3$)/(neutralization ratio*amount of resin in parts*0.303*0.01)  (Equation 2)

According to Equation 2, resin acid values of 9.9 and 10.7 were obtained when the neutralization ratios were 153.2% and 165.9%, respectively. Hence, in the experiments above, any crystalline resin with an acid value between 9.9 and 10.7 will have a neutralization ratio between from about 153.2% to about 165.9% when about 0.297-0.324 parts ammonia are used result in latex particles of around 184±11.8 nm in size.

It will be appreciated that various above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A method of producing latex particles by phase inversion emulsification (PIE) comprising:
   (a) dissolving a crystalline resin having an acid value in a mixture of at least two solvents, a first amount of base and water to form an emulsion;
   (b) adding a second amount of base to the emulsion; and
   (c) converting the emulsion of step (b) into latex particles by the addition of water,
   wherein the crystalline resin has an acid value in the range of from about 9.5 mg KOH/g of resin to about 11 mg KOH/g of resin and step (b) is carried out at a neutralization ratio in the range of from about 150% to about 170% to provide latex particles having a size of less than about 200 nm.

2. The method of claim 1, wherein the crystalline resin is selected from the group consisting of poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate), poly(ethylene-adipamide), poly(propylene-adipamide), poly(butylenes-adipamide), poly(pentylene-adipamide), poly(hexylene-adipamide), poly(octylene-adipamide), poly(ethylene-succinimide), poly(propylene-sebecamide), poly(ethylene-adipimide), polypropylene-adipimide), poly(butylene-adipimide), poly(pentylene-adipimide), poly(hexylene-adipimide), poly(octylene-adipimide), poly(ethylene-succinimide), polypropylene-succinimide), poly(butylene-succinimide), and combinations thereof.

3. The method of claim 1, wherein the at least two solvents are selected from the group consisting of methanol, ethanol, propanol, isopropyl alcohol (IPA), butanol, ethyl acetate and methyl ethyl ketone (MEK).

4. The method of claim 1, wherein said base is ammonia.

5. The method of claim 1, wherein the base is selected from the group consisting of ammonium hydroxide, potassium hydroxide, sodium hydroxide, sodium carbonate, sodium bicarbonate, lithium hydroxide, potassium carbonate and combinations thereof.

6. The method of claim 1, wherein said two solvents are in a v/v ratio of from about 1:2 to about 1:15.

7. The method of claim 1, wherein said process steps occur at a temperature above room temperature.

8. The method of claim 1, further comprising the step:
   (d) removing fluids from said resulting latex particles.

9. The method of claim 1, further comprising combining said latex particles with an amorphous resin and optionally a colorant and/or a wax to form a toner particle.

10. The method of claim 1, wherein the at least two solvents are MEK and IPA.

11. The method of claim 1, wherein said at least two solvents are obtained from a prior phase inversion emulsification.

12. The method of claim 1, wherein said water is obtained from a prior phase inversion emulsification.

13. The method of claim 8, wherein said removing fluids comprises obtaining a solvent from said latex particles.

14. The method of claim 8, wherein said removing fluids comprises obtaining at least two solvents from said latex particles.

15. The method of claim 8, wherein said removing fluids comprises obtaining water from said particles.

16. The method of claim 2, wherein the at least two solvents are MEK and IPA, the base is ammonia, the at least two solvent have an IPA:MEK ratio in the range of from about 1:3 to about 1:10, and the crystalline resin:MEK:IPA ratio is in the range of from about 10:5:1 to about 10:10:2.5.

17. A method of producing latex particles by phase inversion emulsification (PIE) comprising:
   (a) dissolving a crystalline resin having an acid value in a mixture of at least two solvents, a first amount of base and water to form an emulsion;
   (b) adding a second amount of base to the emulsion; and
   (c) converting the emulsion of step (b) into latex particles by the addition of water,
   wherein the crystalline resin has an acid value within a first range and step (b) is carried out at a neutralization ratio within a second range, wherein the first and second ranges are those which provide latex particles having a selected size and over which the size of the latex particles is substantially constant.

18. The method of claim 17, wherein the selected size is less than about 200 nm.

19. The method of claim 17, further comprising
   (d) determining the first and second ranges prior to carrying out steps (a)-(c).

20. The method of claim 19, wherein step (d) comprises
   (i) selecting an emulsion formulation characterized by a selected crystalline resin, a selected crystalline resin amount, a selected solvent, a selected solvent amount, a selected base and a selected total base amount, wherein the sum of the first amount of base and the second amount of base provides the selected total base amount,
(ii) carrying out steps (a)-(c) using the emulsion formulation,
(iii) determining the size of the latex particles, and
(iv) repeating steps (ii)-(iii) using the emulsion formulation, but each time using a different value of the second amount of base.

* * * * *